May 20, 1924. 1,494,458
D. J. CAMPBELL
LAND CLEANING AND CULTIVATOR MACHINE
Filed Nov. 4 1922  5 Sheets-Sheet 1
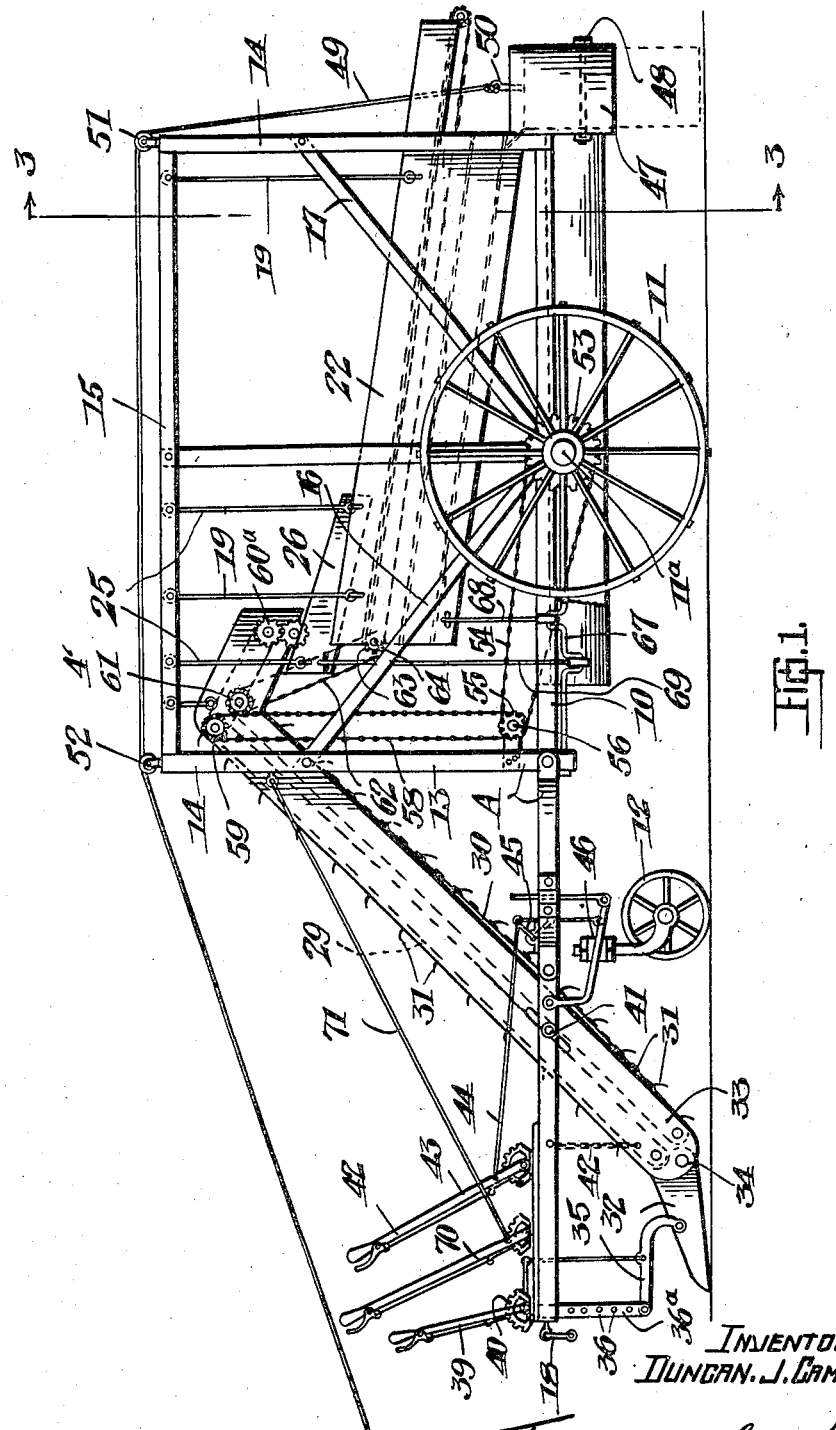

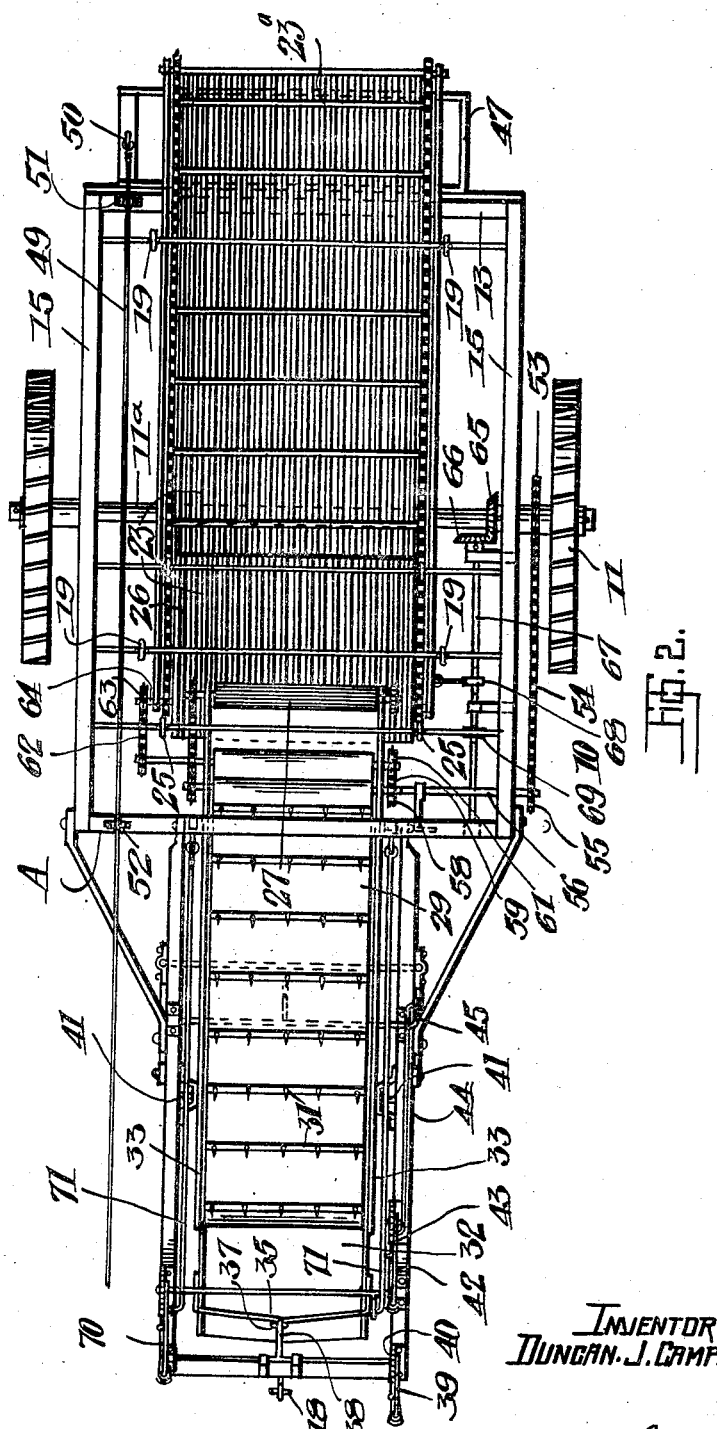

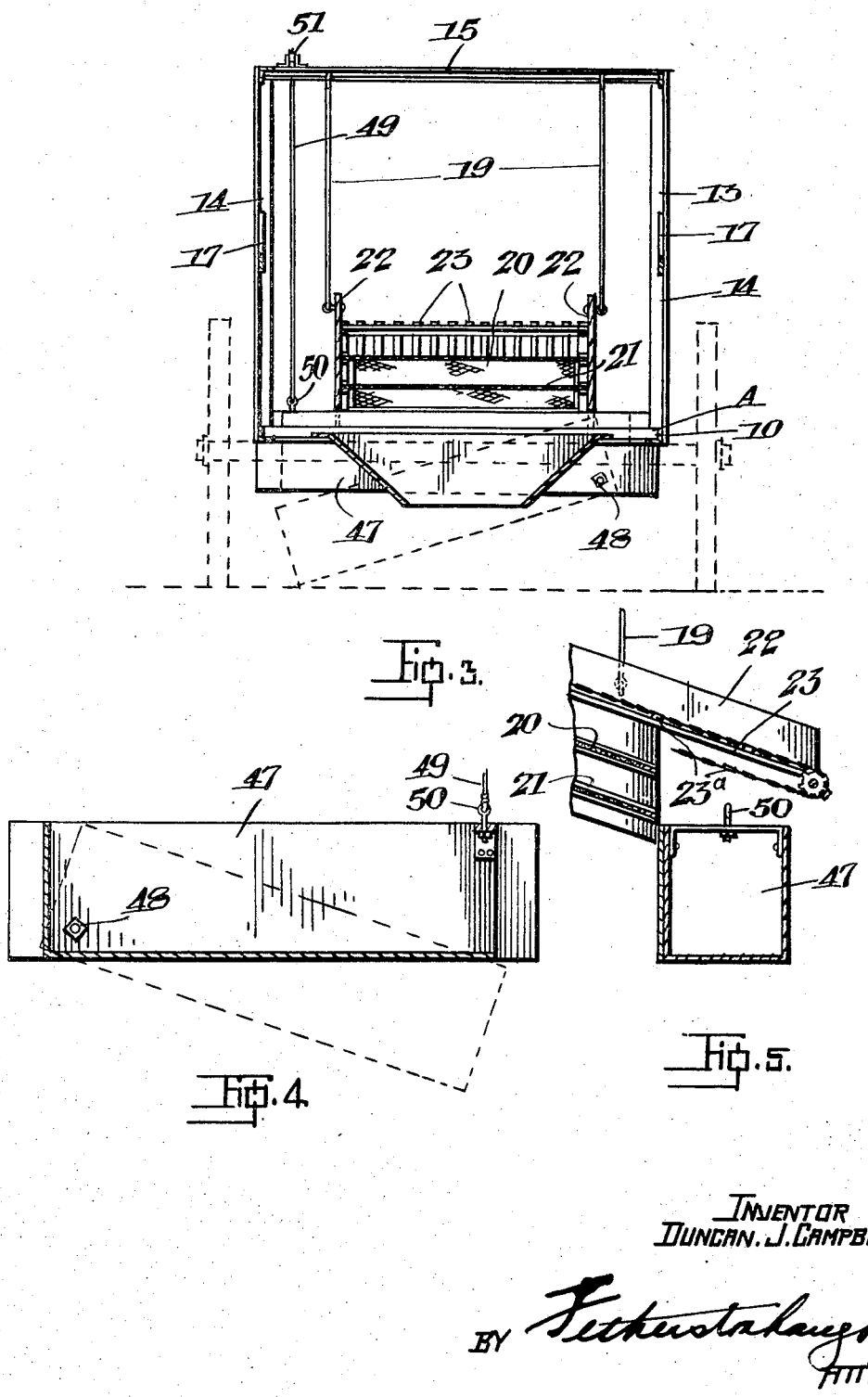

May 20, 1924.
D. J. CAMPBELL
1,494,458
LAND CLEANING AND CULTIVATOR MACHINE
Filed Nov. 4, 1922    5 Sheets-Sheet 4
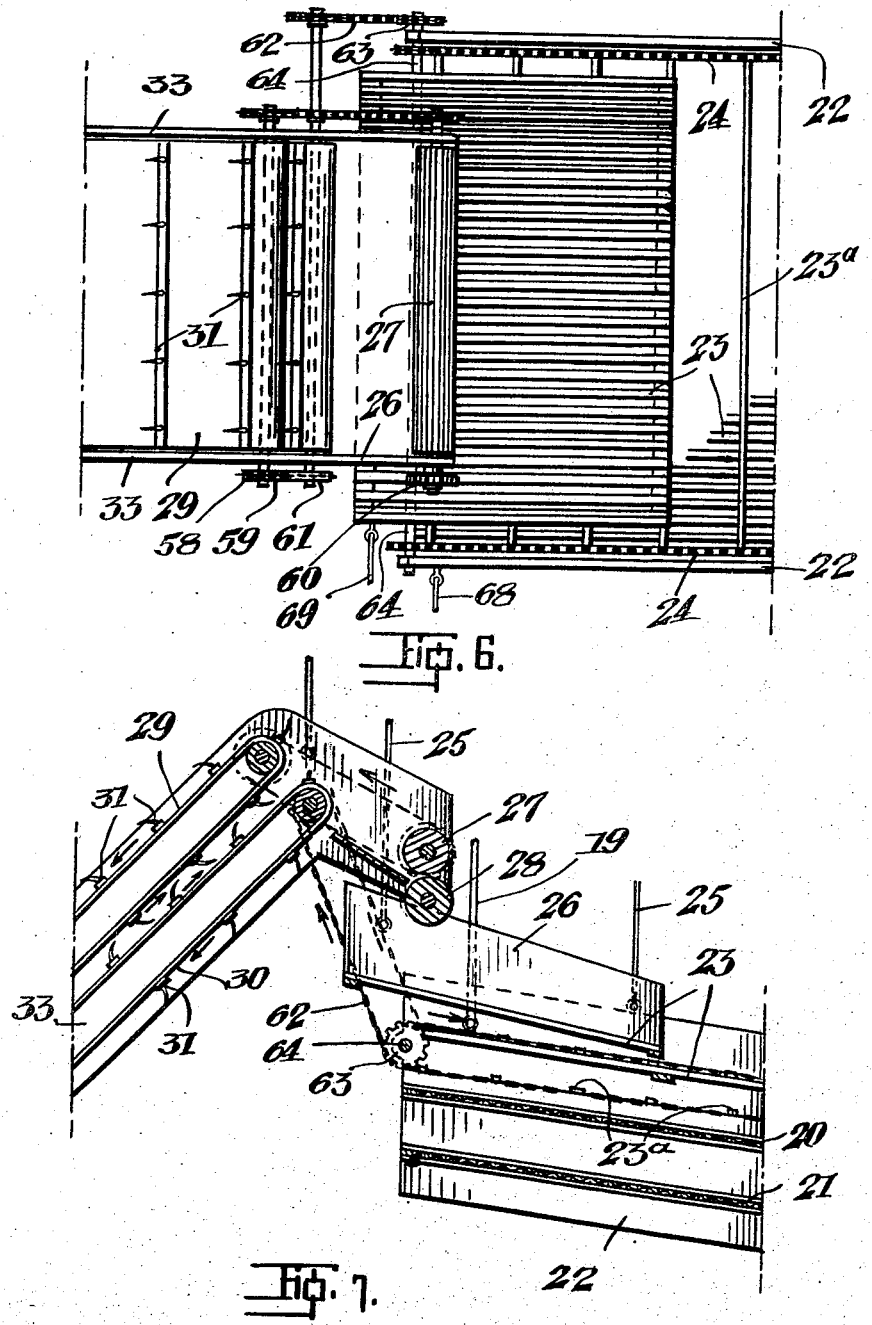
INVENTOR
DUNCAN. J. CAMPBELL.
BY
ATTYS.

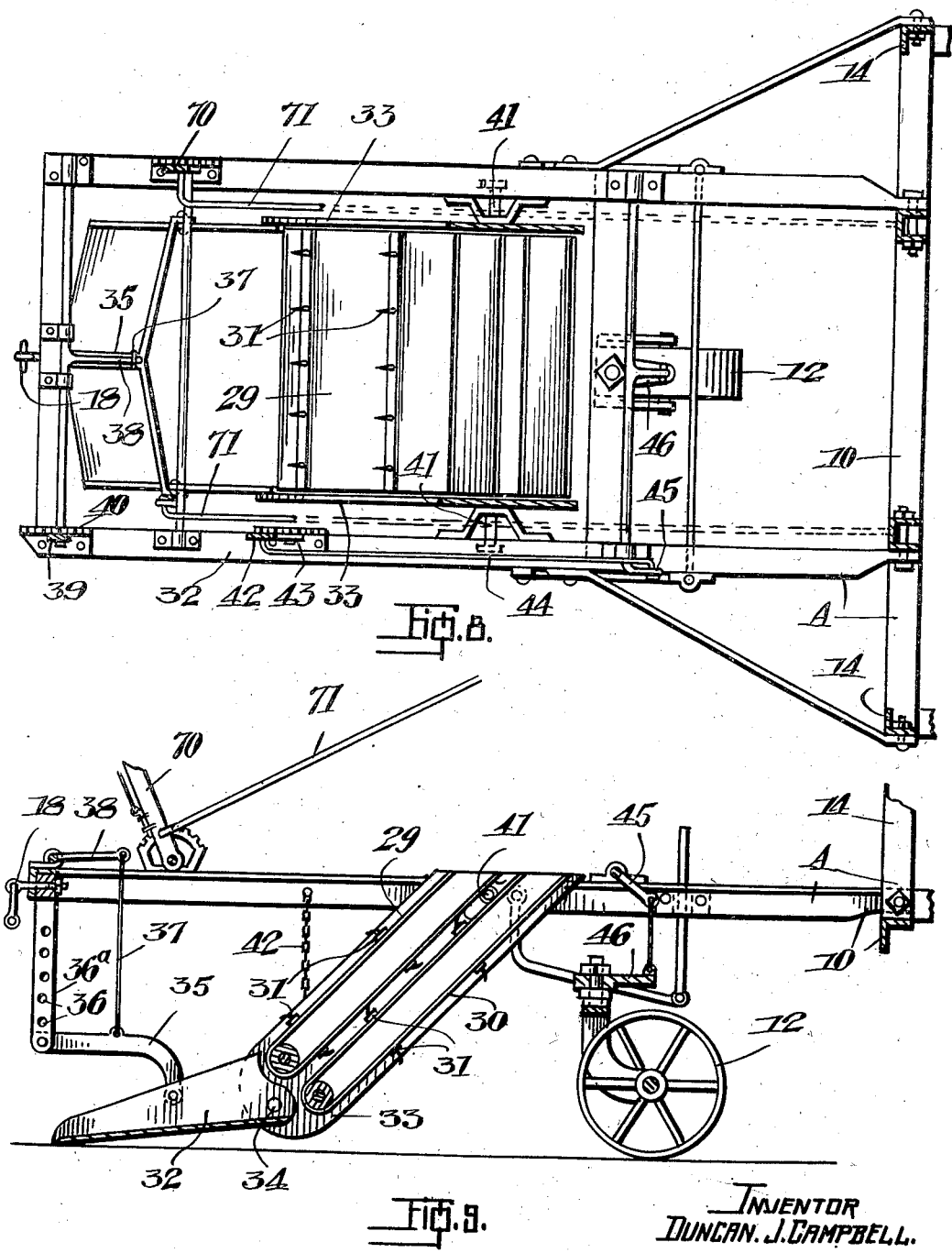

Patented May 20, 1924.

1,494,458

UNITED STATES PATENT OFFICE.

DUNCAN JOHN CAMPBELL, OF GLASGOW STATION, ONTARIO, CANADA.

LAND CLEANING AND CULTIVATOR MACHINE.

Application filed November 4, 1922. Serial No. 599,036.

*To all whom it may concern:*

Be it known that I, DUNCAN JOHN CAMPBELL, a subject of the King of Great Britain, and a resident of Glasgow Station, in the Province of Ontario and Dominion of Canada, have invented certain new and useful Improvements in Land Cleaning and Cultivator Machines, of which the following is a specification.

This invention relates to improvement in land cleaning and cultivator machines, and the objects of the invention are to provide a machine for removing scutch or quack grass, weeds and the like from farm land.

Further objects are to provide a machine of this kind for tillage farm which will, while effectively removing all dirt in the form of weeds, scutch grass and the like, at the same time perform the functions of a cultivator.

A still further object is the provision of an economically constructed cleaning and cultivating machine in which the several parts are so arranged as to perform the functions required of them in a thoroughly satisfactory and permanent manner.

With the foregoing and other objects in view, the invention consists essentially in the novel construction and arrangement of parts as described in the present specification and illustrated by the accompanying drawings that form part of the same.

Referring to the drawings, in which like characters of reference indicate corresponding parts in each figure, and in which:

Figure 1 is a side elvation.

Figure 2 is a plan view.

Figure 3 is a cross-section on the line 3—3 of Figure 1.

Figure 4 is a longitudinal section of the roots and weed box.

Figure 5 is a cross-section of same, showing a portion of the screens.

Figure 6 is an enlarged plan of the upper end of the conveyers and shaker screens.

Figure 7 is a longitudinal section of same.

Figure 8 is an enlarged plan of the forward frame, partly sectional.

Figure 9 is a longitudinal section of same.

In the drawings:

The machine as a whole is designated by the letter A and comprises (as shown in Figures 1 and 2) a frame 10 mounted on wheels 11 on an axle 11ª and provided with a caster wheel 12 whereby the front of the machine can be raised or lowered. Mounted on the body or frame 10 is a skeleton frame 13 combining the side pieces 14, top piece 15 and reinforcing supports 16 and 17. 18 is a link member on the machine front for hitching the machine to a tractor or otherwise.

Suitably suspended by hangers 19 from the frame 13 are screens 20 and 21 arranged one above the other and provided with sides 22 extending above the screens and adapted to provide side guards for a top floor or platform of slats 23. The foregoing portions of the machine are particularly illustrated in Figures 1, 2, 3 and 6.

At the inner top end of the screens is suspended by hangers 25 a delivery shoe 26 operatively arranged in relationship to sets of roller crushers 27 and 28, in turn operatively connected (see Figures 2, 6 and 7) to a double set of elevators 29 and 30 provided with conveying and delivering means 31 adapted to receive weeds, clay, roots and the like from a scoop member 32 mounted between the lower end of the side casing member 33 for the elevators at 34, and adapted, on the machine being moved forward, to scoop up the weeds from the ground and at the same time to partially dig a furrow therein.

This shoe scoop or cultivator member 32 can be raised or lowered by means of a bent horizontal arm 35 fixedly secured thereto and provided with a hole in its opposite end registering individually with a series of holes 36 in a vertical arm or blade 36ª on the machine, the adjustable arm 35 being connected by links 37 and 38 to a lever 39 whereby it is operated, said lever being adapted to engage with a ratchet member 40.

The elevator side casing members 33 are secured to the machine frame at 41 and also supported thereon by hangers 42. For raising or lowering the front of the machine, a caster wheel 12 is operated by a lever member 42 connected through a lever arm 43 with a link 44, in turn connected to the arm 45 engaging the head of the caster 46.

Tiltably mounted at 48 on the end of the machine is a box 47 designed to receive therein material from the screen members 20 and 21 and the slats 23. This box is tilted, when full, to deposit its load by means of a cable 49 attached to the box at 50 and continued on pulleys 51 and 52 across the skeleton frame to be finally operated by a suitable foot control on the tractor or otherwise to which the present machine is hitched.

The bottom of the frame 10 is open and substantially hopper-shaped, as shown in Figure 3, to return the sifted earth to the ground and thus fill up the furrow made originally by the scoop member.

The mechanism of the machine for operating the elevators and fan is as follows: A sprocket wheel 53 is keyed to the main axle and connected by a chain 54 to a sprocket 55 on a shaft 56 on which is mounted a sprocket, in turn chain-connected by a chain 58 to one of the elevator sprockets 59, in turn chain-connected to a roller gear 60. The second elevator sprocket 61 is operated by the chain 58 meshing therewith to be turned from left to right, while the other elevator sprocket 59 is operated to turn from right to left. The second sprocket 61 is connected by a chain 62 to a sprocket 63 on the shaft 64 provided with the endless chains 24 carrying the cross-pieces 23ª.

The rocking movement is imparted to the double screens by means of a bevel gear 65 mounted on the main axle and adapted to mesh with a bracket-supported bevel gear 66 on the end of a crank shaft 67 in suitable bearings in the frame 10. This crank shaft is provided with arms 68 and 69 suitably secured to the screen box and the delivery shoe, respectively, and by means of which, on the machine moving forward, a rocking motion is imparted to both these parts. A lever member 70 is connected by a cable 71 to the skeleton frame and designed, on the machine moving up an incline, to be tightened, so as to retain the skeleton frame in perpendicular position.

It will be seen from the foregoing that I have invented a complete and simply constructed cultivator and land cleaning machine, the operation of which is as follows: The machine being hitched up to a tractor and started in a forward direction, the scoop member or shoe 32 is adjusted to suit the nature of the ground by means of a lever 39 in connection with it and a lever 42 for the caster wheel 12. The earth, weeds, grass and all surface material is taken up by this scoop, delivered to the elevators and from them through the rollers 27, 28, to the delivery shoe, from whence it is forwarded onto the floor 23, where it is partially sifted; all the fine material such as clay, some of the weeds and the smaller stones passing through the slats onto the sieves, where it is again further sifted, and, finally the clay only being delivered through the bottom of the machine, while the smaller stones and some of the weeds are delivered into the tiltable box at the back of the machine; the larger stones, remainder of the weeds being delivered over the top of the box at the rear of the machine to the ground. As soon as the box is full, it is tilted, depositing contents in a mound to be burnt or otherwise disposed of, the sifted clay in the meantime being returned to fill the furrow formed by the shoe in the first instance, and thus leave the ground in good order and clean.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a machine of the character described for cleaning and cultivating farm land comprising, in combination with a frame mounted on wheels and adapted to be hitched to a tractor or otherwise, a double set of screens suspended above said frame, a casing for the screens adapted to support a slat floor movably mounted above said screens, a ground scoop adjustably mounted on the frame, a double set of elevators communicating with said scoop, rollers at the top of said elevators designed to receive therethrough the material from the scoop, a suspended delivery shoe adjacent said rollers adapted to discharge the material onto said movable floor, a box tiltably mounted at the ends of the screens designed to receive the unsifted material therein, an apertured bottom to the frame adapted to receive and discharge the sifted material, means for operating the elevators and the sieves, means for tilting the end box, and means for adjusting the height of the machine.

2. A machine of the character described comprising, in combination, a suitable frame mounted on wheels, double sets of screens suspended above said frame, a movable floor comprising spaced slats mounted on endless chains above said screens, a scoop adjustably mounted in the front of the machine, elevators communicating with said scoop, a plurality of rollers at the other end of said elevators whereby the material scooped and delivered to the elevators is delivered to said rollers, a suspended discharge shoe adapted to receive the material from said rollers and means for operating said shoe to deliver the material to the movable floor, means chain-connected with the axle for driving the elevators, means for discharging the unsifted material comprising a box operatively mounted on the end of the machine, means for operating said box to tilt it when full, means for discharging the screened material comprising an apertured bottom member formed with a hopper-head, means for raising and lowering the front of the machine comprising a caster wheel adapted to be link-connected to an arm, in turn connected to a lever whereby the lever is operated to move the arm to raise or lower said caster wheel.

3. A machine of the class described suitably mounted on wheels and provided with a skeleton frame adapted to support a set of elevators and a double set of suspended screens, scoop means carried by the machine for delivering material to the elevators, a set of rollers between the elevators and the screens and suspended shoe means for delivering the material from the rollers to the screens, means for collecting and discharging the unsifted material from the screeens, means for returning the sifted material to the ground, means for operating the screens comprising in combination with the machine axle, a gear-operated double crank shaft and link members connecting the cranks with the screens and the delivery shoe, respectively, whereby on the machine axle being operated, said screens and delivery shoe are agitated, means for operating the elevators comprising a ratchet wheel keyed to the shaft and chain-connected to a gear-shaft, in turn chain-connected to the elevator gears, whereby, on the axle being turned, the elevators are operated in opposite directions.

In witness whereof I have hereunto set my hand in the presence of two witnesses.

DUNCAN JOHN CAMPBELL.

Witnesses:
NATHANIEL EARL LINDSAY,
MACKIE McLAREN.